United States Patent Office 2,887,498
Patented May 19, 1959

2,887,498
PRODUCTION OF EPOXYALDEHYDES

George W. Hearne, Lafayette, Donald S. La France, Concord, and Harry de V. Finch, Berkeley, Calif., assignors to Shell Development Company, New York, N.Y., a corporation of Delaware No Drawing. Application October 4, 1956
Serial No. 613,835

13 Claims. (Cl. 260—348.5)

This invention relates to the epoxidation of unsaturated aldehydes. It deals with a new process whereby alpha, beta-epoxyaldehydes can be manufactured from the corresponding alpha,beta-ethylenic aliphatic aldehydes by reaction with hypochlorous acid salts.

Various alpha,beta-ethylenic aldehydes have been reacted with hypohalites of different kinds but the products of these reactions have not been the desirable epoxyaldehydes which are provided by the process of the present invention. Thus Waldmann et al., Monatsch, vol. 84, pages 543–50 (1953), has described the reaction of acrolein with sodium hypochlorite brought to pH 7 by addition of hydrogen chloride whereby the chlorohydrin is obtained. More usually, however, only acid compounds have been produced when reacting alpha,beta-ethylenic aldehydes with hypohalites. This is the case when the reaction is carried out as described in Kaufmann patent, U.S. 1,858,-551, or when the methods of Straus et al., Ber. 66, 1834 (1933), and Salchinkin et al., J. Applied Chem., (USSR) 29, 155 (January 1956) are used.

In view of these teachings it was surprising to find that by proper control of the reaction conditions, particularly the temperature and the pH of the reaction mixture, alpha,beta-ethylenic aliphatic aldehydes as a class can be successfully converted to the corresponding alpha,beta-epoxyaldehydes by reaction with a salt of hypochlorous acid. To achieve this new result and minimize formation of undesirable byproducts, especially acids and chlorohydrins, it is essential that the reaction be carried out at a temperature below 20° C., at least throughout the major part of the reaction period, and that the pH of the reaction mixture be maintained above about 8.

The process of the invention thus comprises reacting an alpha,beta-ethylenic aliphatic aldehyde or a mixture of two or more such aldehydes with one or more salts of hypochlorous acid by contacting these reactants at a pH above about 8 and maintaining the temperature of the reaction mixture below 20° C. substantially throughout the reaction period. The reaction takes place in accordance with the equation:

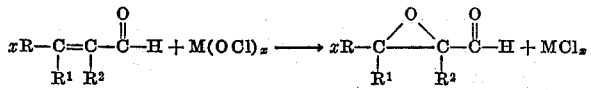

where

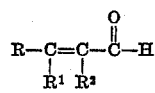

is the alpha,beta-ethylenic aldehyde being epoxidized, R, R¹ and R² being hydrogen atoms or aliphatic radicals which can be the same or different, and $M(OCl)_x$ is the salt of hypochlorous acid employed as epoxidizing agent, M being a cation and $x$ an integer equal to the valence of the cation.

The principal side reactions which may occur in the new process are polymerization of the unsaturated aldehyde and further oxidation of the epoxyaldehyde by hypochlorite. The desired formation of epoxy aldehyde is accelerated by increasing the temperature, the concentration of the hypochlorite solution and the pH of the reaction medium. The polymerization of the unsaturated aldehyde is accelerated by increasing the temperature and pH. It can best be minimized by maintaining an adequate concentration of hypochlorite ions. An increased concentration of hypochlorite ions would be required to prevent polymerization at higher temperatures and pH concentrations. Further oxidation of the epoxyaldehyde is accelerated by increased temperature, hypochlorite ion concentration and pH concentration, i.e. the same factors which increase the rate of formation of the desired epoxyaldehyde. This side reaction is minimized by limiting the contact time of the hypochlorite oxidation to that required for the conversion of substantially all of the unsaturated aldehyde to the desired epoxyaldehyde. A convenient method for accomplishing this is to add an excess of a reducing agent such as sodium sulfite at this point. By using this technique, it is possible to carry out the epoxidation at higher temperatures, higher hypochlorite concentrations and pH than would otherwise be possible. There is, however, an upper limit of 20° C. to the temperature which can be successfully employed for the epoxidation. This is governed principally by the rate of further oxidation of the epoxyaldehyde. The rate factors are interdependent. For example, higher temperatures up to 20° C. can be used by decreasing the hypochlorite ion concentration, the pH or the contact time.

Because of their availability and low cost, inorganic hypochlorites, especially the alkali metal, alkaline earth metal or ammonium salts, are generally advantageous reactants for the new process. Salts which are soluble in the reaction mixture are preferred. Suitable inorganic salts are, for example, sodium hypochlorite, potassium hypochlorite, lithium hypochlorite, ammonium hypochlorite, magnesium hypochlorite, calcium hypochlorite, strontium hypochlorite, zinc hypochlorite, stannic hypochlorite, vanadic hypochlorite, ferric hypochlorite, etc. The salts can be conveniently prepared in the known way by passing chlorine into a solution of the corresponding base or salt of a weaker acid, for instance the water-soluble carbonates or bicarbonates. Such preparation of the hypochlorous acid salt can be separately carried out and the resulting hypochlorite solution then fed to the reaction or the hypochlorite can be produced from the chosen base such as lime and chlorine in situ in the reaction mixture in which the epoxidization is being conducted. Because of their ready availability in tonnage quantities at low cost there is an advantage in using sodium and/or calcium hypochlorite as the preformed epoxidizing agent.

As previously indicated it is desirable to carry out the reaction at a pH of about 8 or higher. Reaction at a lower pH tends to promote formation of chlorohydrination products instead of the desired epoxides. Most hypochlorous acid salts have a sufficiently high pH under the reaction conditions so that there is no need to adjust the pH during the reaction. But the pH of the mixture normally decreases as the hypochlorite is consumed in the reaction and it may be desirable, especially when employing salts of very weak bases, to add a base to the reaction mixture at least during the later stages of reaction when the concentration of such hypochlorous acid salt is low so as to insure the desired pH throughout the reaction and thus promote high yields. This is not essential for successful operation, however, since the pH can be allowed to fall below 8 in the later stages of reaction although some sacrifice in yield will generally result. On this account it is preferred to use hypochlorous acid salts of strong bases such as the alkali and alkaline earth metal hypochlorites with which a high pH is maintained in the mixture throughout the reaction without addition of other basic agent. Too high a pH in the reaction mixture is also undesirable because of the tendency of alpha,beta-ethylenic aldehydes and especially the alpha-methylidene alkanals

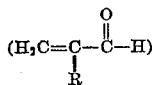

to undergo condensation and polymerization reactions under strongly basic conditions. As a rule, the best results are obtained by reaction with the pH in the range of about 8 to about 12.

The alpha,beta-ethylenic aliphatic aldehyde and hypochlorous acid salt can be used in a wide range of proportions. Ordinarily, it is advantageous to use at least one gram equivalent of —OCl per gram mole of alpha,beta-ethylenic aldehyde. Higher yields are usually obtained by the use of an excess of hypochlorite. For reasons of economy, it is preferred not to use an excess of hypochlorite greater than about 10% more than the stoichiometric requirement for the reaction. With the preferred range of about 1 to about 1.1 gram equivalents of —OCl per gram mole of alpha,beta-ethylenic aldehyde it is generally feasible to operate without recovery of excess reagent, but other proportions in the range of about 0.5 to about 2 gram equivalents of —OCl per gram mole, for example, can be employed by recovering the excess reactant and recycling it to the reaction.

The reaction is advantageously carried out in a liquid medium which serves as a diluent to reduce the concentration of the reactants since undesirable side reactions, especially acid formation, can be reduced in this way. Water is an especially useful diluent for this purpose. When using alpha,beta-ethylenic aliphatic aldehydes which have a low solubility in water it is advantageous to employ another solvent, preferably a mutual solvent for the reactants instead of or together with water. Water-soluble alcohols are useful mutual solvents, especially the less reactive tertiary alcohols such, for instance, as tertiary butyl alcohol and the like, although other alcohols such as methanol, ethanol, isopropanol, isobutyl alcohol, allyl alcohol, methallyl alcohol, etc. can also be used. Polyhydric alcohols, for instance, ethylene glycol, 2-methyl-2,4-pentanediol, etc., can be similarly used, as can other solvents, preferably non-acidic solvents such as ketones, ethers, and the like, for example, diethyl ketone, cyclohexanone, ethyl amyl ketone, dimethyl ether, ethylene glycol monomethyl ether, dioxane, etc. The best results have been obtained when the reaction is carried out with amounts of liquid diluent such that the concentration of epoxyaldehyde product in the mixture on completion of the reaction is not greater than about 25% and more advantageously is between about 2% and about 15% by weight of the mixture.

The reaction is exothermic and relatively rapid and since, as previously pointed out, it is essential that the temperature be maintained below 20° C. substantially throughout the reaction, it will usually be necessary to provide efficient cooling in large scale operations. The highest yields of alpha,beta-epoxy aliphatic aldehydes have been obtained when the temperature of the reaction mixture has been kept below about 10° C. at all times until the reaction is complete. Preferably temperatures between the freezing point of the mixture and about 5° C. are used, temperatures of about —10° to +5° C. being especially suitable. Under these conditions, reaction times of the order of about 2 minutes to about 2 hours or more are suitable, although short times in the range of about 5 to about 10 minutes are generally preferred.

The new process can be carried out successfully in a variety of different ways. The reactants can be introduced in any convenient order, but it is usually preferable to contact the reactants under conditions such that at least a small excess of hypochlorite is present at all times. One method of batchwise reaction which has been found to be advantageous comprises feeding the alpha,beta-ethylenic aldehyde and hypochlorous acid salt in about stoichiometric proportions into a stirred solution of the hypochlorous acid salt while cooling the mixture to maintain the necessary low reaction temperature. The reactants are preferably fed as solutions in the same or in mutually miscible solvents forming a homogeneous reaction mixture. However, it is feasible to operate with a two-phase system, for example, an emulsion or suspension of a water-insoluble alpha,beta-ethylenic aldehyde in an aqueous solution of the chosen hypochlorous acid salt. Rapid mixing of the reactants is an aid in reducing undesirable by-product formation.

Alternatively, the batchwise method of reaction can be carried out by charging all of the hypochlorous acid salt dissolved in a suitable solvent, preferably water, to a stirred reactor provided with temperature control means and then feeding in the alpha,beta-ethylenic aliphatic aldehyde to be epoxidized. The aldehyde can be fed directly or as a solution in a solvent. The rate of feed is adjusted in conjunction with cooling so as to maintain the preferred temperature of less than 15° C.

The process can be carried out continuously in apparatus of the foregoing type, for example, by partially reacting an initial charge of hypochlorous acid salt as described above, then continuously adding alpha,beta-ethylenic aldehyde and an excess of hypochlorous acid salt, preferably in solution, to the reactor while continuously or intermittently withdrawing alpha,beta-epoxy aliphatic aldehyde-containing reacted mixture from the reactor for recovery of product. The same result can be obtained, usually more advantageously, by using as the reactor a cooler with or without a time tank in series therewith and employing a pump to circulate reaction mixture therethrough as a continuously circulating stream into which alpha,beta-ethylenic aliphatic aldehyde and hypochlorous acid salt are continuously fed at separate points sufficiently separated from the point of withdrawal of reaction mixture that substantial reaction is achieved before removal of the product-containing mixture from the reactor. A plurality of reactors of either of these, or other types, can be used with the solution of hypochlorous acid salt flowing therethrough in series while the same or different alpha,beta-ethylenic aliphatic aldehydes are added at each reaction stage at such a rate as to maintain the mixture at the desired reaction temperature. Additional hypochlorous acid salt solution can also be introduced into one or more of the later reaction stages. Or more advantageously, the alpha,beta-ethylenic aliphatic aldehyde can be fed at spaced points along the path of flow of the reaction mixture through a tubular or other suitable form of reactor in which the proper temperature is maintained. Such cooling can be achieved by external cooling or evaporation of a volatile component of the mixture, for instance, a liquefied gaseous hydrocarbon such as butane or isopentane can be added and the pressure on the system regulated so that it will evaporate at the chosen reaction temperature. As in the previously described modification of the process, hypochlorous acid salt solution can be fed into the stream of reaction mixture at intermediate points between the points of alpha,beta-ethylenic aliphatic aldehyde feed.

The alpha,beta-epoxy aliphatic aldehyde produced can be recovered from the reaction mixture in any suitable manner, account being taken of the reactive nature of these compounds, especially the tendency of the epoxide ring to undergo hydration in aqueous media, slowly under neutral conditions and more rapidly under acidic or basic conditions.

On completion of the reaction the mixture will contain, when using the previously indicated preferred method of reaction, in addition to the alpha,beta-epoxyaldehyde product, a small amount of excess hypochlorous acid salt, chloride corresponding to the cation of such salt, solvent used in the process and by-products formed in the reaction in relatively small amounts compared with the epoxyaldehyde product. A small amount of polymerization inhibitor or mixture of inhibitors, such as hydroquinone, ditertiary butyl-para-cresol, catechol, and substituted para-phenylenediamines, e.g. N,N'-dimethyl-para-phenylenediamine, will usually also be present in the mixture since it is preferred to add such inhibitor with the alpha, beta-ethylenic aliphatic aldehyde feed in order to minimize its polymerization prior to reaction. One suitable method of recovering alpha,beta-epoxy aliphatic aldehyde from such mixtures is flash distillation under approximately neutral conditions, using reduced pressure, preferably at a temperature below 100° C., more preferably at between about 50° C. and about 80° C. Steam stripping is also suitable for such distillation. The time of exposure of the epoxyaldehydes to elevated temperatures should be shorter the higher the temperature in order to minimize side reactions, particularly hydration of the epoxy group. The flashed epoxy aliphatic aldehyde will be found to be quite stable after this removal from the salts and can be advantageously used as thus recovered in aqueous solution.

Other methods of recovery such as extraction with ether or the like can also be used and where the alpha, beta-epoxy aliphatic aldehydes are desired as intermediates for further synthesis, it is often advantageous to use the epoxidation mixture for this purpose without distilling off the epoxyaldehyde therefrom although it may be desirable to destroy or remove any excess unreacted hypochlorous acid salt or other components which may interfere with the desired synthesis.

The following examples are illustrative of some of the suitable methods of carrying out the new process and show some of its advantages. Proportions are by weight unless otherwise indicated.

*Example I*

This example illustrates the production of epoxypropionaldehyde by epoxidizing acrolein with calcium hypochlorite.

A stirred reactor arranged for cooling with ice water was charged with a 5% aqueous calcium hypochlorite which was brought to a temperature of 0°–5° C. A 12% aqueous solution of acrolein was then fed in over a period of about 45 minutes while keeping the temperature at 0°–5° C. After feeding in 94% the stoichiometric amount of acrolein for reaction with the calcium hypochlorite charged, the addition of acrolein was stopped. The reaction mixture was stirred for an additional 84 minutes after which it was neutralized with normal hydrochloric acid and steam stripped at 100° C. in a metal column packed with glass helices. The stripping was carried out without reflux using a take-off rate approximately equal to the feed rate.

A sample of the crude reaction product taken before stripping was analyzed and showed a yield of epoxypropionaldehyde of 87% based on the acrolein applied. The yield of recovered epoxypropionaldehyde in the stripping operation was 70%.

The epoxypropionaldehyde obtained is readily converted to glycerine by acidifying the overhead product from the stripping to pH about 1 by addition of a small amount of sulfuric acid and allowing the solution to stand at room temperature until hydration is substantially complete as shown by titration for epoxide. The resulting glyceraldehyde solution is then hydrogenated after neutralization by adding Raney nickel catalyst and heating at about 80° C. in an autoclave under an initial hydrogen pressure of about 1000 p.s.i.g. Concentration and Claisen distillation affords glycerine of good purity boiling 124°–126° C. at less than 1 mm. pressure. Yields of purified glycerine of 70% and better, based upon the amount of acrolein applied, have been obtained in accordance with the present invention.

*Example II*

This example illustrates the epoxidation of acrolein with sodium hypochlorite.

Using the method of Example I but employing a 5% aqueous solution of sodium hypochlorite as the initial charge and feeding in 95.7% of the theoretical amount of acrolein for reaction therewith, there was obtained a crude reaction product containing a 94% yield of epoxypropionaldehyde based on the acrolein charged as determined by analysis.

This dilute crude product was simultaneously stripped and concentrated in a plate column without reflux at 75° C. by taking off distillate at one-half the feed rate to the column. There was about a 50% increase in concentration of epoxypropionaldehyde in the distillate which was recovered in 78% yield.

*Example III*

When feeding undiluted acrolein into 15% aqueous sodium hypochlorite at a rapid rate into the same reactor so that the total reaction time was only 10 minutes while the temperature was maintained at 0° C. or less, titration showed a 98% yield of epoxypropionaldehyde, based on acrolein applied. The concentration of epoxypropionaldehyde in the crude product was about 12%.

In another test in which acrolein was reacted with a 5–6% solution of sodium hypochlorite and the product was steam stripped at 75° C. under reduced pressure (300 mm.) with 100% volume overhead, the yield of recovered epoxypropionaldehyde was 82% on applied acrolein.

*Example IV*

This example illustrates the effect of reaction temperature on the yield of epoxypropionaldehyde when epoxidizing acrolein with sodium hypochlorite.

In a series of runs at different temperatures but otherwise under identical conditions, acrolein and 21% sodium hypochlorite solution were added simultaneously to a stirred reactor while keeping a small excess (about 5% of the theoretical requirement for the reaction) of sodium hypochlorite in the reactor at all times. The reaction time was 15 minutes. The yields of epoxypropionaldehyde as determined by titration of the reaction mixtures were as follows:

| Average Reaction Temperature, °C. | Yield of Epoxypropionaldehyde, percent of Acrolein Fed |
|---|---|
| −5 | 95 |
| +4 | 85 |
| +21 | 15 |
| +25 | 10 |

*Example V*

Two similar product preparations were made in a stirred flask reactor using 0.75 mole of sodium hypochlorite (ca. 19% w. concentration) and 0.71 mole of acrolein. The acrolein was added within ten minutes while cooling was applied to hold the temperature at 0°–15° C. Titration of the crude products showed a yield of 90–91% of the applied acrolein to epoxypropionaldehyde. The products were steam stripped under reduced pressure at 55°–60° C. to give recovered (distilled) epoxypropionaldehyde. The recovery of overhead epoxide was 85 and 88 %m. in these two preparations.

The two distillates were combined and a portion then was purified by salting out and solvent extraction. The extract was dried with magnesium sulfate, filtered off, and concentrated in a distilling column at 50 mm. mercury pressure. The distilled concentrate was again dried over magnesium sulfate, filtered off, and redistilled to yield a heart cut of epoxypropionaldehyde which had the following properties:

Boiling point _____ 58°–60° C. at 100 mm.
ca. 112°–113° C. at 760 mm.
Refractive index
($n_D^{20}$) _____ 1.4255.
Epoxide value _____ 1.31 eq./100 grams.

The epoxide value corresponds to 94% purity as epoxypropionaldehyde.

*Example VI*

This example illustrates the production of alpha,beta-epoxybutyraldehyde from crotonaldehyde according to the invention.

Crotonaldehyde was added dropwise over a period of 97 minutes to a 5% w. water solution of calcium hypochlorite in a stirred reactor maintained at 2° C. After an amount of crotonaldehyde equivalent to the calcium hypochlorite present had been added, during which time the pH of the mixture fell from 12.5 to 9.98, the product was neutralized and analyzed and found to contain alpha,beta-epoxybutyraldehyde in a yield of 84% of the theoretical, based on the crotonaldehyde charged.

Stripping the product solution with steam at 100° C. resulted in a salt-free distillate containing 85% of the epoxybutyraldehyde charged to the stripper or a 71% yield of recovered epoxybutyraldehyde based on the crotonaldehyde charged.

The recovered alpha,beta-epoxybutyraldehyde solution was hydrolyzed by acidifying to pH 1 and holding at room temperature. The hydrolyzed product after neutralizing with sodium hydroxide was hydrogenated using 10% ruthenium on carbon as the catalyst at 70° C. under 1200 p.s.i.g. of hydrogen pressure for 180 minutes and 1,2,3-butanetriol, boiling 116°–121° C. at 1 mm. was obtained as the product.

*Example VII*

This example illustrates the epoxidation of methacrolein according to the invention.

Using methacrolein instead of crotonaldehyde in the process of Example VI gave an 87% conversion to epoxybutyraldehyde, based on titration of the reacted mixture. Steam stripping the crude product at 100° C. gave a distillate containing 89% of the epoxyisobutyraldehyde fed to the stripper or a yield of epoxyisobutraldehyde of 77% of the theoretical based on the methacrolein charged to the reactor.

When a more concentrated solution of calcium hypochlorite (10% w.) was used under the same conditions, a 77% conversion of methacrolein to epoxyisobutyraldehyde in a product containing 0.061 equivalent of epoxide per 100 grams was obtained.

Hydration of the distilled epoxyisobutyraldehyde by treatment with 0.99 N sulfuric acid and standing at room temperature, followed by neutralization and hydrogenation with Raney nickel catalyst at 100° C. maximum temperature under 1000 p.s.i.g. of hydrogen gives beta-methyl glycerol (B. P. 120°–122° C. at 3 mm.).

It will be understood that the foregoing examples are merely illustrative and that the present invention broadly comprises contacting an alpha,beta-ethylenic aliphatic aldehyde with a salt of hypochlorous acid at a temperature below 20° C. and a pH above about 8 whereby epoxidation of the aldehyde takes place and an alpha,beta-epoxy aliphatic aldehyde containing the same number and arrangement of carbon atoms as the starting ethylenic aldehyde is obtained as the principal product of the reaction. Specific alpha,beta-ethylenic aliphatic aldehydes, other than those used in the example, well adapted for conversion to the corresponding alpha,beta-epoxyaldehydes by the new process, include alpha-ethylacrolein, alpha - isopropylacrolein, alpha - hexylacrolein, beta-methylcrotonaldehyde, beta-cyclohexylacrolein, beta-methyl-beta-isopropylacrolein, alpha-methyl-beta,beta-diethylacrolein, geranial, alpha - isopropylcrotonaldehyde, and beta-allylacrolein. When using alpha-beta-ethylenic aliphatic aldehydes having more than one multiple linkage between carbon atoms in the molecule, as is the case with geranial and beta-allylacrolein mentioned above, it is a feature of the new process of the invention that the ethylenic linkage alpha,beta to the aldehyde group is selectively epoxidized giving unsaturated epoxyaldehydes which are valuable new compounds otherwise difficult to synthesize. Thus from geranial and beta-allylacrolein there are obtained alpha,beta-epoxy geranial and 2,3-epoxyhexen-5-al, respectively. In general, the most favorable yields and conversions have been obtained with alpha,beta-ethylenic aliphatic aldehydes having 3 to 10 carbon atoms per molecule, especially good results being obtained with alpha,beta-alkenals of 3 to 6 carbon atoms. The new process of this invention is of particular value in the epoxidation of alpha-methylidene alkenals of 3 to 6 carbon atoms per molecule which because of their high reactivity, especially their great tendency to polymerize, are exceptionally difficult to convert to epoxides by prior methods.

The alpha,beta-epoxy aliphatic aldehydes made available by the new process are valuable compounds. In addition to their use as intermediates in the manufacture of polyols having numerous established applications as shown in the foregoing examples, they are useful for other purposes. They can be reacted with polycarboxylic acids or polyhydric alcohols at the epoxy group to form resinous polyesters and polyethers which can be cured by cross linking through the aldehyde groups in making surface coatings, moldings and castings. It will therefore be seen that the invention offers many advantages.

We claim as our invention:

1. In a process for producing an alpha,beta-epoxy aliphatic aldehyde by epoxidizing an alpha,beta-ethylenic aliphatic hydrocarbon aldehyde, the improvement comprises contacting said ethylenic aldehyde with an inorganic salt of hypochlorous acid which is soluble in the reaction mixture at a temperature below 20° C. while maintaining the pH of the reaction mixture above 8 substantially throughout the reaction.

2. A process in accordance with claim 1 wherein the reaction is carried out in an aqueous solvent for the reactants at a temperature not higher than about 10° C. throughout the reaction.

3. In a process for producing an alpha,beta-epoxyalkanal by epoxidizing an alpha,beta-monoethylenic alkenal of 3 to 10 carbon atoms per molecule of the formula

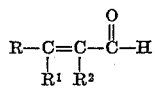

wherein R, $R^1$ and $R^2$ each represents a member of the group consisting of hydrogen and alkyl radicals, the improvement which comprises reacting said alkenal with an aqueous solution of an inorganic salt of hypochlorous acid which is soluble in the reaction mixture at a temperature below 20° C. while maintaining the pH of the reaction mixture above 8 substantially throughout the reaction.

4. A process in accordance with claim 3 wherein at least an equivalent amount of hypochlorite is maintained in the reaction mixture throughout the reaction.

5. A process in accordance with claim 3 wherein the hypochlorite is a member of the group consisting of the alkali metal and alkaline earth metal hypochlorites.

6. In a process for epoxidizing alpha-ethylacrolein, the improvement which comprises reacting said alkenal with an aqueous solution of an inorganic salt of hypochlorous acid which is soluble in the reaction mixture at a temperature below 20° C. while maintaining the pH of the reaction mixture above 8 substantially throughout the reaction.

7. A process in accordance with claim 6 wherein the reaction mixture is maintained at a pH between about 8 and about 12 throughout the reaction.

8. In a process for producing an alpha,beta-epoxy-alkanal by epoxidizing an alpha,beta-monoethylenic alkenal containing from 3 to 10 carbon atoms and of the formula

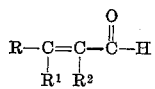

wherein R, $R^1$ and $R^2$ each represents a member of the group consisting of hydrogen and alkyl radicals, the improvement which comprises adding an aqueous solution of said alkenal and an aqueous solution of an inorganic salt of hypochlorous acid to an aqueous medium at a temperature below about 15° C. while maintaining the pH of the mixture above about 8 and recovering from the mixture alpha,beta-epoxypropionaldehyde having the same number and arrangement of carbon atoms as said alkenal.

9. A process in accordance with claim 8 wherein an excess of hypochlorite over the stoichiometric requirement for epoxidation of the alkenal is maintained in the mixture throughout the reaction.

10. A process for producing epoxypropionaldehyde which comprises reacting acrolein with an inorganic salt of hypochlorous acid which is soluble in the reaction mixture at a temperature below 20° C. while maintaining the pH of the reaction mixture above 8 substantially throughout the reaction.

11. A process in accordance with claim 10 wherein an aqueous solution of acrolein is reacted with an alkali metal hypochlorite at a temperature of about −5° to +10° C.

12. A process for producing epoxyisobutyraldehyde which comprises reacting methacrolein with an inorganic salt of hypochlorous acid which is soluble in the reaction mixture at a temperature below 20° C. while maintaining the pH of the reaction mixture above 8 substantially throughout the reaction.

13. A process for producing alpha,beta-epoxybutyraldehyde which comprises reacting crotonaldehyde with an inorganic salt of hypochlorous acid which is soluble in the reaction mixture at a temperature below 20° C. while maintaining the pH of the reaction mixture above 8 substantially throughout the reaction.

References Cited in the file of this patent
UNITED STATES PATENTS

| | | |
|---|---|---|
| 1,858,551 | Kaufmann | May 17, 1932 |
| 2,288,344 | Brooks | June 30, 1942 |
| 2,765,296 | Strain | Oct. 2, 1956 |